United States Patent Office 2,715,911
Patented Aug. 23, 1955

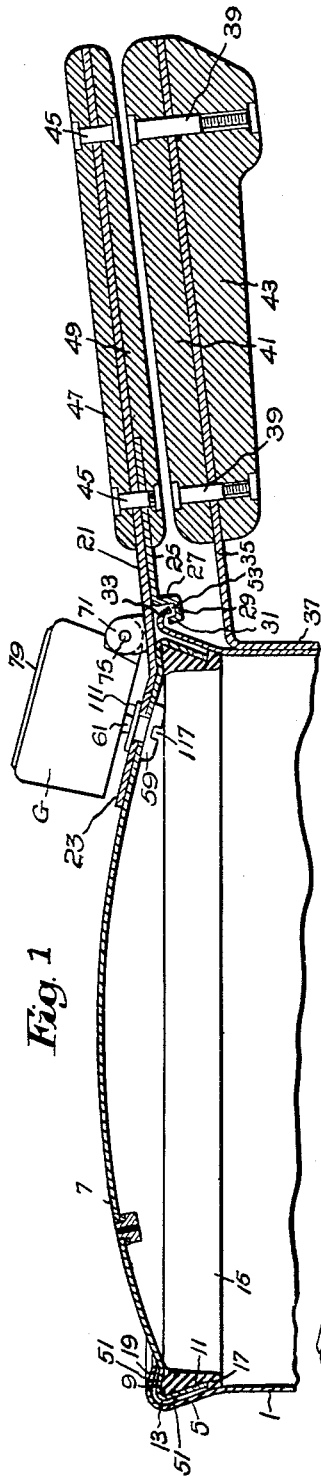

2,715,911

PRESSURE CONTAINERS HAVING RELIEF VALVES WITH AUTOMATICALLY ALIGNING SEATS

William A. Welden, Stamford, Conn., assignor to Revere Copper and Brass Incorporated, Rome, N. Y., a corporation of Maryland Original application September 6, 1946, Serial No. 695,128, now Patent No. 2,614,725, dated October 21, 1952. Divided and this application July 26, 1952, Serial No. 301,081

2 Claims. (Cl. 137—527.8)

My invention, which relates to pressure cookers and has among its objects a pressure cooker relief valve of improved construction, will be best understood from the following description when read in the light of the accompanying drawings of a specific embodiment of the invention selected for illustrative purposes, while the scope of the invention will be more particularly pointed out in the appended claims.

This application is a division of applicant's pending application Serial Number 695,128, filed September 6, 1946, now Patent No. 2,614,725, issued October 21, 1952.

In the drawings:

Fig. 1 is a medial vertical section of the upper portion of a pressure cooker embodying a form of the invention, with parts in elevation;

Fig. 2 illustrates a fragment of Fig. 1 on an enlarged scale, with further parts of Fig. 1 in section;

Fig. 3 is a plan view of the body of the handle extension of the cover of the pressure cooker according to Fig. 1;

Fig. 4 is a bottom view of the body of the handle extension according to Fig. 3;

Fig. 5 is a plan of the tiltable valve carrying member according to Fig. 2;

Fig. 6 is a side elevation of the valve carrying member according to Fig. 5;

Figs. 7, 8 and 9 are, respectively, sections of the valve and valve seat according to Fig. 2 with parts in different operative positions; and Fig. 10 is a bottom view of the valve seat according to Fig. 2.

The pressure cooker illustrated is identical with that illustrated by Figs. 1 to 15 of applicant's above mentioned Patent 2,614,725, Figs. 1 to 4 of said patent being omitted herein as unnecessary.

Referring to the drawings, the pressure cooker illustrated comprises a container having cylindrical side walls 1, and, integral therewith, a closed bottom (not shown). Preferably the container is formed of sheet metal, such as sheet stainless steel, by a deep drawing operation.

As shown, adjacent the brim of the container the side walls are formed with an upwardly and outwardly flaring frusto-conical portion 5. The cover 7 for the cooker is formed with a central dome-shaped portion provided adjacent its outer edge with the narrow slightly upwardly extending continuous annular portion 9, and with an inwardly and downwardly converging continuous frusto-conical edge flange 11, the flange and portion 9 being connected by a rounded corner portion 13. The cover edge flange 11 is adapted to be rotatably received within the frusto-conical brim portion 5 of the container. The cover, like the container, is also preferably formed of sheet metal such as stainless steel.

In the cooker illustrated the cover carries an annular gasket 15 of yieldable elastic material, for example vulcanized synthetic rubber, suitably plasticized DuPont nylon, or the like. As shown, the gasket is of wedge-shaped cross-section, its upper edge or base and its outer annular surface being shaped to fit in the recess between the interior sides of the portion 9, rounded corner 13, and edge flange 11 of the cover when sprung into such recess. The gasket extends well below the lower edge of the cover edge flange to provide an apex portion 17 of reduced thickness, which portion extends radially outward beyond the lower edge of the flange to adapt the outer annular surface of the apex portion to seat yieldingly on the interior walls of the tapered brim portion 5 of the container.

As illustrated, the container at its brim is provided with an inwardly projecting lip 19, this lip as shown in the aforementioned patent extending for about 180° of the angular extent of the flared portion 5 of the container. Carried by the cover is a handle extension 21, preferably formed of sheet metal such as stainless steel. As shown, the handle extension is integrally formed with a disk-like base portion 23 which rests on top of the cover toward one lateral edge thereof and is connected thereto in any suitable manner, preferably by spot welding. Secured to the under side of the handle extension 21, for example by spot welding, is a plate 25. This plate, at its end adjacent the container, is formed with a downturned portion 27 extending for the width of the plate, the lower edge of this downturned portion being bent outward, as indicated at 29 (Fig. 1), and upward, as indicated at 31, to form a hook. The container brim diametrically opposite the lip 19 thereof is formed with an outwardly projecting angularly extending downturned lip 33 adapted to be received by the hook 27, 29, 31 of the cover when the parts are in the position illustrated by the drawings.

The container is provided with a handle extension 35, also preferably formed of stainless steel, the downturned base portion 37 of which extension is secured to the exterior lateral walls 1 of the container in any suitable way as by spot welding. At opposite sides of the handle extension 35 are secured, by bolts 39, the portions 41 and 43 of a handle grip. To the handle extension 21 of the cover are secured, by bolts 45, the portions 47 and 49 of a second handle grip. By rotating the cover relative to the container by means of the cover handle grip the hook carried by the cover handle extension 21 may be moved out of registry with the lip 33 of the container, whereupon the cover handle grip may be moved upward and outward relative to the container to tilt the cover and pull its edge from under the inwardly projecting lip 19 of the container. The cover may be assembled in operative position with relation to the container by motions in the opposite direction.

The parts are so designed that when the cover is initially placed on the container the outer annular surface of the apex portion 17 of the gasket rests on the interior surface of the upwardly and outwardly flaring brim portion 5 of the container, so that the weight of the cover and associated parts causes the gasket initially to seal the joint between the cover and the container to permit steam pressure to build up in the cooker when its contents are heated. This is made possible because the apex portion of the gasket projects radially outward beyond the exterior surface of the edge flange 11 of the cover, and because the parts are so designed that when such apex portion seats on the portion 5 of the container a space or clearance, indicated at 51 (Fig. 1), exists between the peripheral portions of the cover and the adjacent portions of the container, while a space or clearance 53, between the lower edge of the downturned lip 33 of the container and the portion 29 of the hook carried by the handle extension 21, exists when the cover is initially placed on the container. When the pressure builds up in the cooker the cover raises to bring it into contact with the inwardly extending lip 19 of the container, and the upper surface of the portion 29 of the hook into contact with the lower edge of the downwardly extending lip 33 of the container, so as to retain the cover on the container. When the cover so lifts the gasket moves with it to maintain the seal, the apex portion of the gasket sliding over and remaining in contact with the interior surface of the flared portion 5 of the container against which surface it is pressed by the steam pressure, which latter also presses the remaining portions of the gasket against the inner surfaces of the portions 9, 13 and 11 of the cover. The clearance between the portion 5 of the container and the edge flange of the cover also results in that, if the cooker is allowed to cool without opening the safety valve hereinafter described, the apex portion of the gasket will yield to relieve the vacuum which otherwise would be created in the container, which vacuum would make it difficult to remove the cover. The construction described by reason of the clearance between the cover and adjacent parts of the container makes the sealing action of the gasket entirely independent of the discrepancies in manufacture of the cover and container and warping of the same when subjected to heat or usage.

As illustrated, the cover of the container and base portion 23 of the handle extension 21 are provided with aligned perforations 55 and 57 which form an opening for receiving the valve seat member 59 with which cooperates a conical pressure relief valve 61. As shown, the pressure relief valve is formed with a reduced diameter cylindrical portion 63 providing a shoulder 65 between such portion and the body of the valve. The reduced diameter portion of the valve is driven into and tightly fits a perforation 67 in a disk-like plate 69, the under surface of the plate being abutted by the shoulder 65. At its edge this plate is shown as formed with a hub portion 71 which is received between the upwardly projecting perforated ears 73 integrally carried by the handle extension 21, a pin 75 driven through these ears and rotatably fitting the perforation 77 in the hub 71 serving pivotally to mount the plate 69 for swinging movement on the handle extension.

Carried by the plate 69 is a pressure gauge G having a relatively heavy casing so that the gauge serves as a weight tending to keep the valve 61 closed. The gauge is so constructed that when mounted as shown its dial faces upward in inclined position to the horizontal so that it may be readily read from above by the operator standing in front of a stove on which the cooker rests. In general the internal mechanism for moving the index hand of the gauge forms no part of the present invention, and therefore will not be described with any more particularity than necessary to describe said invention.

As shown, the casing 81 of the gauge at its lower side is recessed to form a circumferential flange 83 surrounding a flat annular shoulder portion 85. The plate 69 is received in this recess, and is removably secured to the gauge casing by screws 87 tapped into the interior flange 89 of the casing, a gasket 91 being interposed between the upper side of the plate at its peripheral portion and the flange 89 to form a fluid tight connection. Interiorly the flange 89 of the gauge casing is formed with an annular shoulder 93 on which rests the peripheral edge portion of a corrugated flexible diaphragm 95 for operating the actuating member 97 of the gauge, the diaphragm about its peripheral edge being soldered to the flange 89, as indicated at 99, so as to close the opening surrounded by the flange. At one side the flange 89 is cut away, as indicated at 101 and 103, to form a notch for receiving the hub portion 71 of the plate 69, both the flange 83 of the casing and the gasket 91 being correspondingly cut away. As shown, the valve 61 is provided with an axial through opening 105 for admitting pressure fluid to the chamber between the plate 69 and the gauge diaphragm 95. By removing the screws 87 the gauge can be readily detached from the plate 69 to permit cleaning of said chamber, in which latter condensate, food and other foreign material in time may collect and, if allowed to remain, would interfere with proper operation of the gauge, the construction also readily permitting the replacement of the gauge when worn and damaged. It will be observed that removing such material from the gauge could not be readily accomplished were the gauge of the Bourdon type.

The valve seat member 59 is preferably formed of resilient synthetic rubber or other material which will withstand the cooking temperatures and not be adversely affected by grease. As shown (see Fig. 7), it comprises a cylindrical portion 107 with which at opposite ends thereof respectively are integrally formed annular lateral end flanges 109 and 111, the flange 111 being elastic enough to be deformed and permit the member to be sprung into the opening formed by the perforations 55 and 57 in the cover and base 23 of the handle extension 21. For permitting passage of the pressure fluid through the valve seat member it is formed with an axial opening 113 which at one end is shown as formed with a conical valve seat 115. Preferably, the flange 109 at its under side is formed with the radially extending grooves 117 intersecting the opening 113 in the member to eliminate the possibility of leaf-like vegetables or the like clogging said opening.

Preferably the cylindrical portion 107 of the valve seat member has a diameter less than that of the opening formed by the perforations 55 and 57 which receive it, so that the valve seat member is capable of a lateral motion relative to the cover to enable proper seating of the valve 61. Preferably the sides of the flanges 109 and 111 facing the cover are dished out so that when the valve and gauge are manually tilted into the open position of the valve, and the valve seat member is thus relieved of the weight of the gauge, the peripheral edges only of the flanges will be in contact with the under surface of the cover and the upper surface of the base 23 of the handle extension 21, as shown in Fig. 7. When the valve is initially closed, as shown in Fig. 8, the weight of the valve and gauge will cause the valve seat member to be depressed to cause the lower surface of the upper flange 111 to bear substantially throughout its extent against the upper surface of the base 23 of the handle extension. This will prevent any escape of pressure fluid about the exterior of the valve seat member through the opening in the cover and handle extension base from the interior of the pressure cooker. When the pressure builds up sufficiently in the container with the valve closed the valve seat member and valve will lift and the lower flange 109 will be deformed by the pressure to cause it to seat throughout its extent on the under side of the cover as viewed in Fig. 9, so as still to prevent pressure fluid from escaping from the interior of the container through the opening in the cover which receives the valve seat member. The dished out construction of the flanges causes a minimum of surface contact between them and the surfaces on which they are adapted to rest so as to facilitate lateral movement of the valve seat member, and further acts to prevent entrance of foreign matter between them and the seating surfaces when the cover is not in use. This dished out construction, particularly that of the upper flange 111, acts to trap air under that flange when the valve is in raised position, so that when the weight of the valve is initially applied to the valve seat member to flatten said flange the trapped air will tend to escape from beneath the flange radially outward thereof, which will act to cause the valve seat member to float on a film of air while said flange is flattening, which floating will facilitate the valve moving the valve seat member laterally to cause the valve properly to seat.

It will be understood in the above connections that when heat is initially applied to the pressure cooker the valve will be opened by the operator flipping the gauge to its extreme limit of upward swinging to permit air to escape from the cooker. As soon as steam is observed to issue through the valve seat member the gauge will be manually flipped by the operator to cause the valve 61 to seat on the valve seat member, and the latter will move laterally, if necessary, relative to the cover, to cause the valve automatically to seat about its periphery. At the termination of the cooking operation the valve may be again flipped open to relieve the cooker of pressure. The parts are so designed that when the valve is flipped into its open position the center of gravity of the gauge and associated parts will be to the right of the pivot pin 75, as viewed in Fig. 2, so that the valve will be maintained in open position.

If the pressure in the cooker becomes excessive the valve will open to permit the gradual escape of steam without the valve being thrown wide open by the pressure. This is because of the extensive substantially parallel relatively closely spaced surfaces defining the upper and lower sides of the space between the plate 69 and the upper surface of the base portion 23 of the handle extension 21. It has been found that in absence of such a construction the pressure when it acts to open the valve will open it to its limit of travel, violently throwing it to its extreme limit of upward swinging. It is believed that the improved action is due to the fact that the steam passing outward through the space mentioned tends to expand and condense and thus form a reduced pressure zone adjacent the peripheral portions of the space and thereby prevent the building up of an excessive mean effective pressure in the space tending unduly to force the valve upward. A further function of the plate 69 is that it acts as a shield for protecting the operator from an upwardly directed jet of steam.

It will be understood that, within the scope of the appended claims, wide deviations may be made from the forms of the invention described without departing from the spirit of the invention.

I claim:

1. A pressure container comprising a wall having an opening with seating surfaces surrounding said opening at the upper and lower sides respectively of said wall, a movable weighted pressure relief valve having an exterior conically tapered seating surface, a valve seat member mounted in said opening for lateral movement relative to said wall, which member is formed with a container vent opening that receives and seats said valve, said member having a portion loosely extending through said opening of said wall, upper and lower laterally extending flanges carried by said portion adapted respectively to seat on said seating surfaces of said wall, the upper flange on its side adjacent said wall being dished to contact with the adjacent seating surface on said wall only adjacent the periphery of that flange when the valve is out of contact with the valve seat member and the lower flange is not subjected to fluid pressure whereby to facilitate lateral sliding of said member relative to said wall when said valve is being initially seated on said member thus to secure accurate seating of said valve, said upper flange also being of elastic material for flexing and increasing its area of contact with said adjacent seating surface of said wall when the weight of the valve is initially applied to the valve seat member whereby to seal the joint between said member and wall to permit pressure to build up in the container.

2. A pressure container comprising a wall having an opening with seating surfaces surrounding said opening at the upper and lower sides respectively of said wall, a movable weighted pressure relief valve having an exterior conically tapered seating surface, a valve seat member mounted in said opening, which member is formed with a container vent opening that receives and seats said valve, said member having a portion loosely extending through said opening of said wall for permitting lateral movement of said member relative to said wall and also having upper and lower laterally extending flanges carried by said portion adapted respectively to seat on said seating surfaces of said wall, which flanges have portions of elastic material presenting dished surfaces opposed to the seating surfaces of said wall contacting with the latter only adjacent their peripheries when the valve is open and the container is not under pressure whereby to facilitate lateral sliding of said valve seat member relative to said wall when said valve is being initially seated on said member thus to insure accurate seating of said valve, the upper flange being adapted to flex for increasing its area of contact with the adjacent seating surface of said wall when the weight of the valve is initially applied to the valve seat member whereby to seal the joint between said member and wall to permit pressure to build up in the container, the lower flange being adapted to flex to present an increased area of contact with the adjacent seating surface of said wall for sealing the joint between said valve seat member and wall when pressure builds up in the container.

References Cited in the file of this patent

UNITED STATES PATENTS

| 1,337,981 | Waggoner | Apr. 20, 1920 |
| 2,195,266 | Bailey | Mar. 26, 1940 |
| 2,330,610 | Natter | Sept. 28, 1943 |
| 2,396,233 | Abrams | Mar. 12, 1946 |